United States Patent [19]
Imaura

[11] Patent Number: 6,059,647
[45] Date of Patent: May 9, 2000

[54] METHOD FOR REMOVING A CASING FROM A FOOD STUFFED IN THE CASING, AND AN APPARATUS THEREFOR

[75] Inventor: Hiroshi Imaura, Wakayama, Japan

[73] Assignee: Ryowa Co., Ltd., Wakayama, Japan

[21] Appl. No.: 09/181,990

[22] Filed: Oct. 29, 1998

[30] Foreign Application Priority Data

Oct. 29, 1997 [JP] Japan .................................. 9-296575

[51] Int. Cl.⁷ .................................................. A22C 13/00
[52] U.S. Cl. ................................................................ 452/50
[58] Field of Search ................................................ 452/50

[56] References Cited

U.S. PATENT DOCUMENTS

| | | | |
|---|---|---|---|
| 2,672,649 | 3/1954 | Demarest et al. | 452/50 |
| 4,637,095 | 1/1987 | Maruska | 452/50 |
| 5,094,649 | 3/1992 | Hall et al. | 452/50 |

*Primary Examiner*—Willis Little
*Attorney, Agent, or Firm*—Wenderoth, Lind & Ponack, L.L.P.

[57] ABSTRACT

A method and apparatus for removing a tubular casing made of a flexible sheet from a food stuffed in the casing are disclosed. The casing is sealed at an opening portion thereof with a sealing means. The method includes stripping one end portion of the casing from a food body, and holding the casing stripped in the preceding step by a pulling means. The method includes pulling the stripped casing outwardly by the pulling means, while the pulling means and the food body are allowed to move relative to each other with respect to a lengthwise direction and a circumferential direction of the food body. The casing is peeled spirally from the food body.

22 Claims, 19 Drawing Sheets

METHOD FOR REMOVING A CASING FROM A FOOD STUFFED IN THE CASING, AND AN APPARATUS THEREFOR

BACKGROUND OF THE INVENTION

The present invention relates to a method and apparatus for removing a tubular casing from a food, such as a ham or a sausage, stuffed in the casing. The casing is made of a flexible sheet made from a paper, synthetic resin or the like, and is sealed at an opening portion thereof with a sealing means.

Hams, for example, are one of the foods stuffed into the casings. Generally, small-sized hams are sold with the ham bodies stuffed in casings. While on the other hand, large-sized hams are sold with the ham bodies taken out of the casings, sliced, and airtightly packed in synthetic containers with a predetermined number of slices (usually more than ten slices).

In general, the slicing of the ham body has been already automated by using a slicing machine, but the removal of the casing prior to the slicing has not yet been automated. Accordingly, manual work has been performed hitherto by workers cutting into the casing with a cutter or the like, and then peeling it off from the ham body.

The large-sized hams, which generally have a diameter in the order of 80–130 mm, a length in the order of 600–1800 mm and corresponding weights, are hard to handle so that a large amount of time and labor is needed for the removal of the casing. This factor has been responsible for reducing the production efficiency in a ham factory.

SUMMARY OF THE INVENTION

In light of the circumstances mentioned above, the present invention has been made. It is an object of the invention to provide a method for removing a casing from a food stuffed in a casing and an apparatus thereof, which allows the casing to be removed from the food automatically and efficiently.

To accomplish the object mentioned above, a method for removing a casing from a food stuffed in the casing according to the invention comprises the steps of: stripping one end portion (leading end portion) of the casing from a food body; holding the casing stripped in the preceding step by a pulling means (pulling mechanism); and pulling the stripped casing outwardly by the pulling means, while the pulling means and the food body are allowed to move relative to each other with respect to a lengthwise direction and a circumferential direction of the food body, whereby the casing is spirally peeled from the food body.

In the method above, it is preferable that at a point in time when the casing is peeled from the food body so far as to reach a portion of the food body in the vicinity of the other end (trailing end portion) of the casing, the pulling of the casing by the pulling means and the circumferential relative movement between the pulling means and the food body are halted, and only the lengthwise relative movement between the pulling means and the food body is continued, whereby the other end portion of the casing is peeled from the food body.

An apparatus for removing a tubular casing from a food stuffed in the casing according to the invention comprises a pulling means for holding one end portion of the casing and pulling it outwardly; and a moving means for allowing the pulling means and the food body to move relative to each other with respect to a lengthwise direction and a circumferential direction of the food body.

The apparatus may comprise a clamping means (clamp) for grasping a sealing means (seal) at one end of the casing or a portion of the casing in the vicinity of the sealing means to strip the one end portion of the casing from the food body and to allow the stripped casing to be held by the pulling means.

Further, the apparatus may further comprise a cutting means (cutting mechanism) for making a cutting line in a portion of the casing in the vicinity of the one end of the same before the one end portion of the casing is stripped from the food body by the clamping means.

DETAILED DESCRIPTION OF THE PREFERRED EMBODIMENTS

Referring now to the accompanying drawings, an apparatus for removing a casing from a food stuffed in the casing according to the present invention will be described below. It is to be understood, however, that the scope of the invention is by no means limited to the illustrated embodiment.

Figure 1:
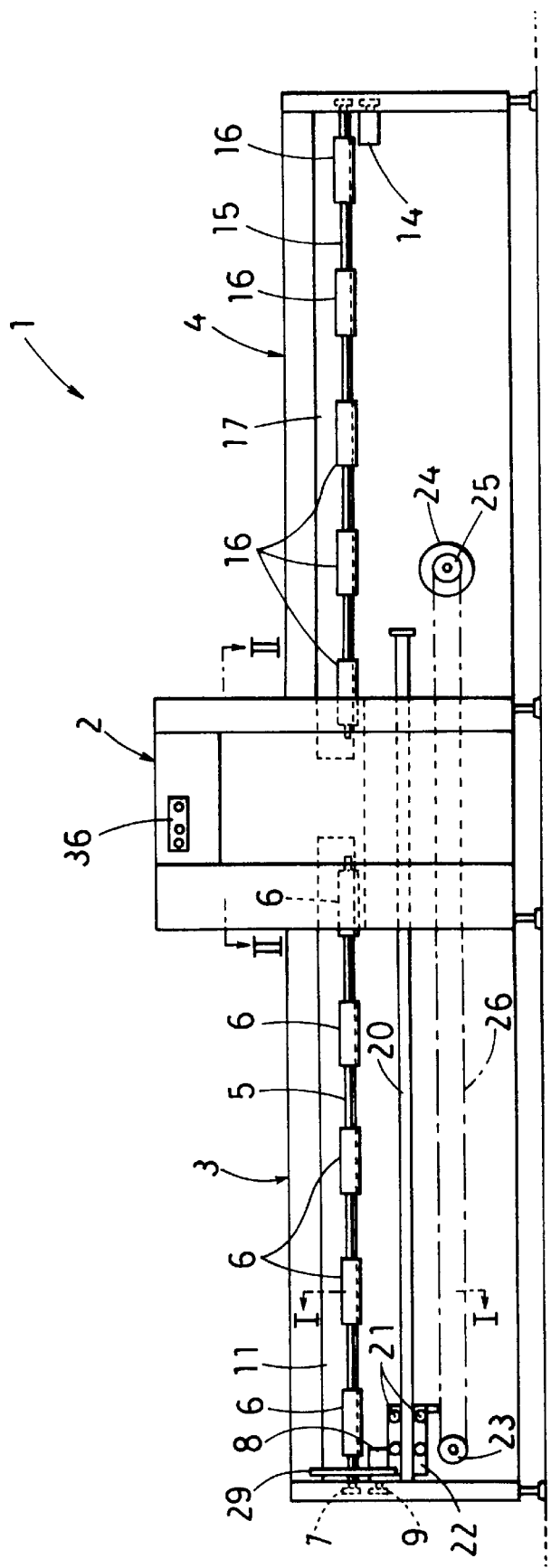
FIG. 1 is a front view of a casing removing apparatus of an embodiment of the invention.
Figure 2:
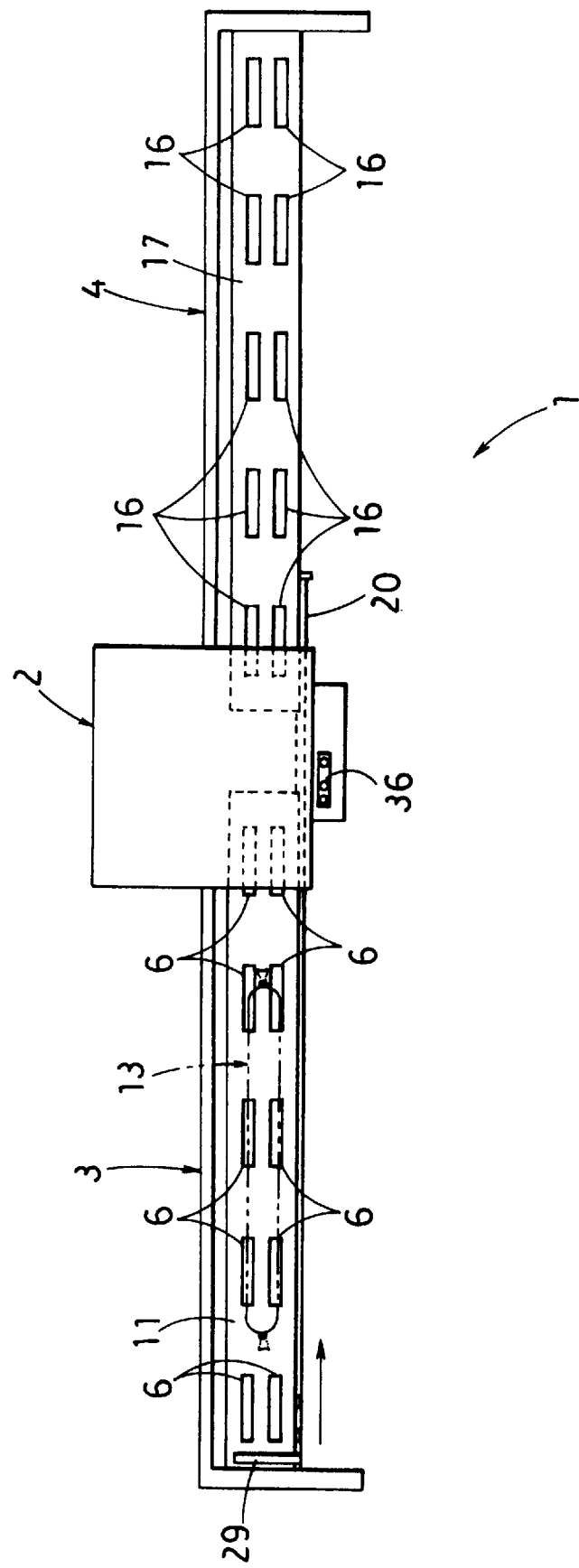
FIG. 2 is a plan view of the casing removing apparatus of FIG. 1.

A casing removing apparatus indicated by numeral 1 in FIGS. 1 and 2 is provided, at a lengthwise center portion thereof, with a processing portion 2. A food receiving portion 3 and a food take-out portion 4 are provided respectively one at each side of the processing portion 2 to extend continuously therefrom.

Figure 3:
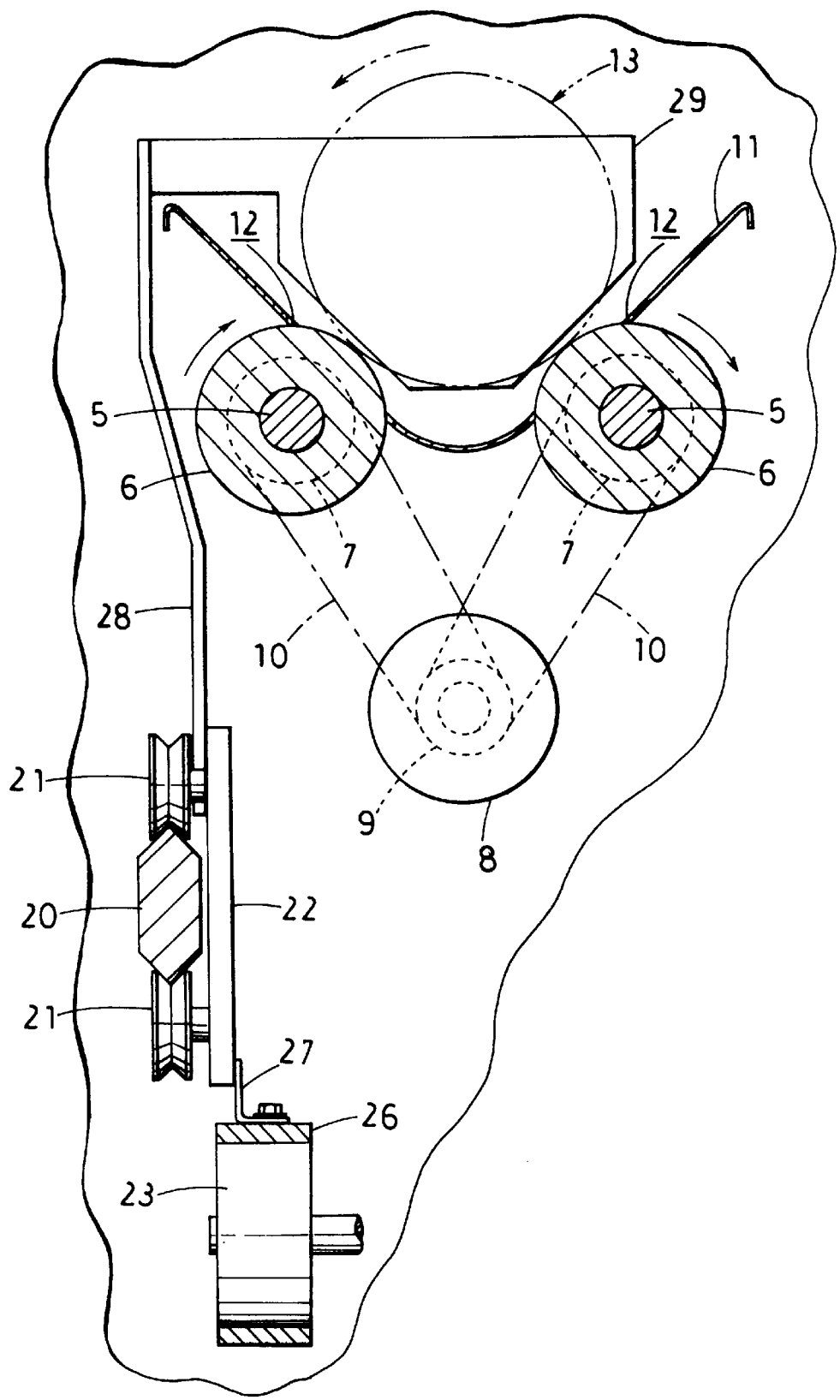
FIG. 3 is an enlarged sectional view of FIG. 1 taken along line I—I of FIG. 1.

The food receiving portion 3 is provided with a pair of horizontally extending, food-carrying rotation shafts 5 (see FIG. 3) rotationally supported via bearings (not shown). The food-carrying rotation shafts 5 each have a plurality of food rotating rollers 6 longitudinally spaced at a predetermined interval. Also, the food-carrying rotation shafts 5 each have pulleys 7 at one end thereof. Provided between the pulleys 7 and a pulley 9 of a motor 8 is a ring-shaped belt 10, via which the respective food-carrying rotation shafts 5 are rotationally driven in the direction indicated by an arrow in FIG. 3. A trough 11 with a generally V-shaped cross-section is arranged over the pair of food-carrying rotation shafts 5. The trough 11 has square openings 12 through which the food rotating rollers 6 partially project above, as shown in FIG. 3. A ham 13 (one example of a food stuffed in casing) is provided between these two rows of food rotating rollers 6 projecting through the trough 11 and is driven to rotate in the direction indicated by an arrow.

Though a detailed illustration is omitted, the food take-out portion 4 is also provided with a pair of rotationally supported, food-carrying rotation shafts 15. The food-carrying rotation shafts 15 each have a plurality of food rotating rollers 16 longitudinally spaced at a predetermined interval. Also, each of the food-carrying rotation shafts 15 is connected to a motor 14 so that while the food-carrying rotation shafts 5 are rotationally driven, the food-carrying rotation shafts 15 can be driven to rotate in the same direction as the food-carrying rotation shafts 5. In addition, a trough 17 with a generally V-shaped cross-section identical to the trough 11 is arranged over the pair of food-carrying rotation shafts 15, and the food rotating rollers 16 partially project above the trough 17. The ham 13 is provided between these two rows of projecting food rotating rollers 16 and is driven to rotate as in the same way as mentioned above. As indicated by a dotted line in FIG. 1, the food-carrying rotation shafts 5 and the trough 11 in the food receiving portion 3, and the food-carrying rotation shafts 15 and the trough 17 in the food take-out portion 4 extend into an interior of the processing portion 2.

As shown in FIGS. 1–3, a rail 20, which is parallel to the food-carrying rotation shafts 5, is arranged under the trough 11 so as to extend from one end portion of the food receiving portion 3 through the processing portion 2 so far as to reach a position in the food take-out portion 4. A movable member 22 is supported on the rail 20 via a plurality of wheels 21, which hold the rails 20 in a sandwiched relationship from above and below, so as to be freely movable in a longitudinal direction on the rail 20. As shown in FIG. 1, a belt 26 runs between a pulley 23 provided in the vicinity of one end of the rail 20 and a pulley 25 of a motor 24 provided in the vicinity of the other end of the rail 20. The belt 26 is connected to the movable member 22 via a coupling member 27 (see FIG. 3). Further, as shown in FIG. 3, a food carrying plate 29 confronting an upper surface of the trough 11 is fixedly secured to an upper end of a supporting rod 28, which extends upwardly from the movable member 22.

When the motor 24 is rotated in a normal rotation direction and in the reverse rotation direction, the movable member 22 and the food carrying plate 29 reciprocates horizontally along the rail 20 nearly the whole distance between the one end of the rail 20 and the other end thereof. When the movable member 22 is moved toward the food take-out portion 4, the food carrying plate 29 will pass through the processing portion 2 and into an upper portion of the trough 17 at an end portion thereof. As indicated by a two-dot chain line in FIG. 2, the ham 13 on the food rotating rollers 6 in the food receiving portion 3 is pushed in the longitudinal direction by the food carrying plate 29 while it is rotationally driven, as previously mentioned. Then, the ham 13 is moved into and passed through the processing portion 2, and is pushed out onto the food rotating rollers 16 in the food take-out portion 4.

Figure 4:
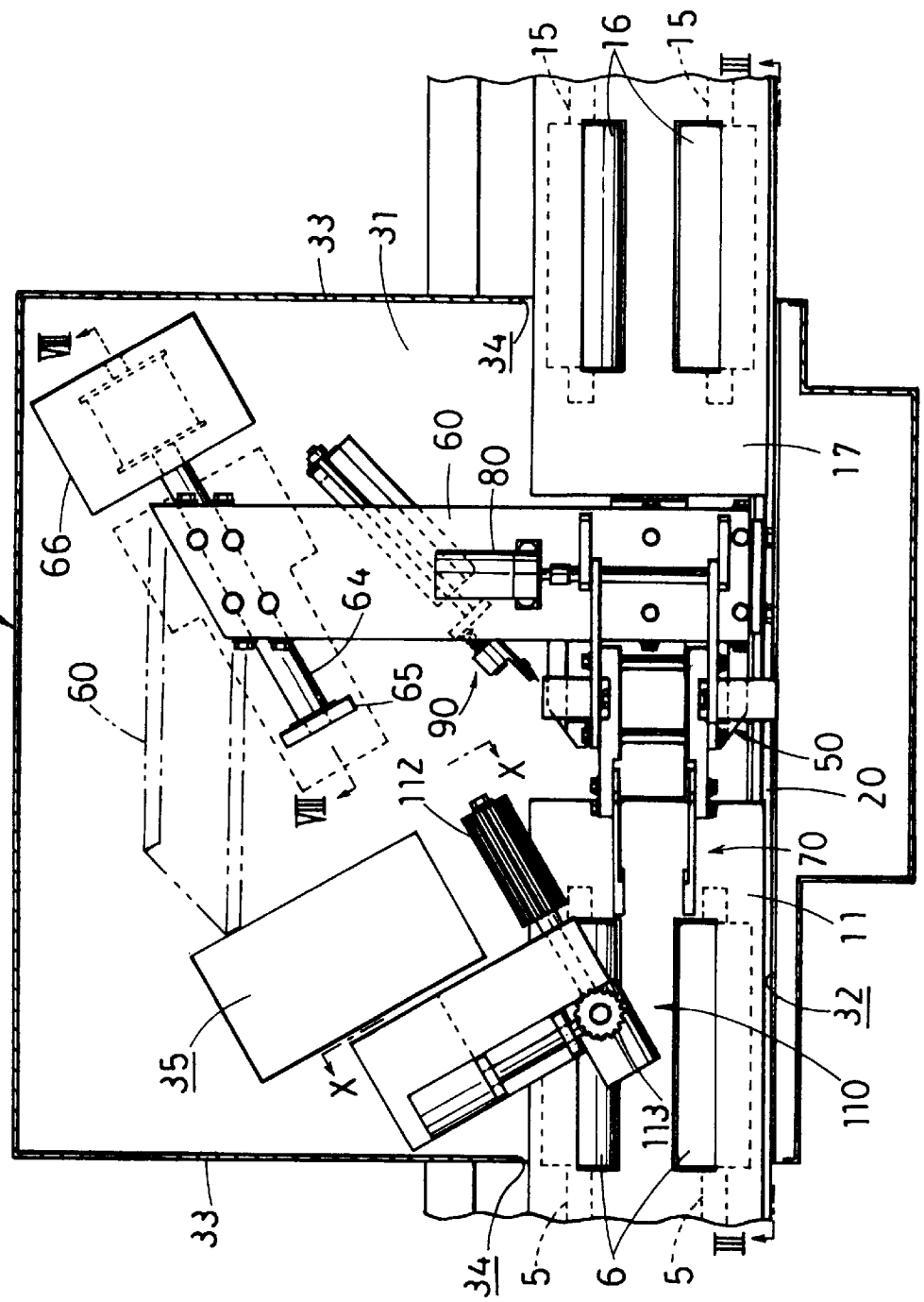
FIG. 4 is a plan view taken along line II—II of FIG. 1, showing an interior mechanism of a processing portion.
Figure 5:
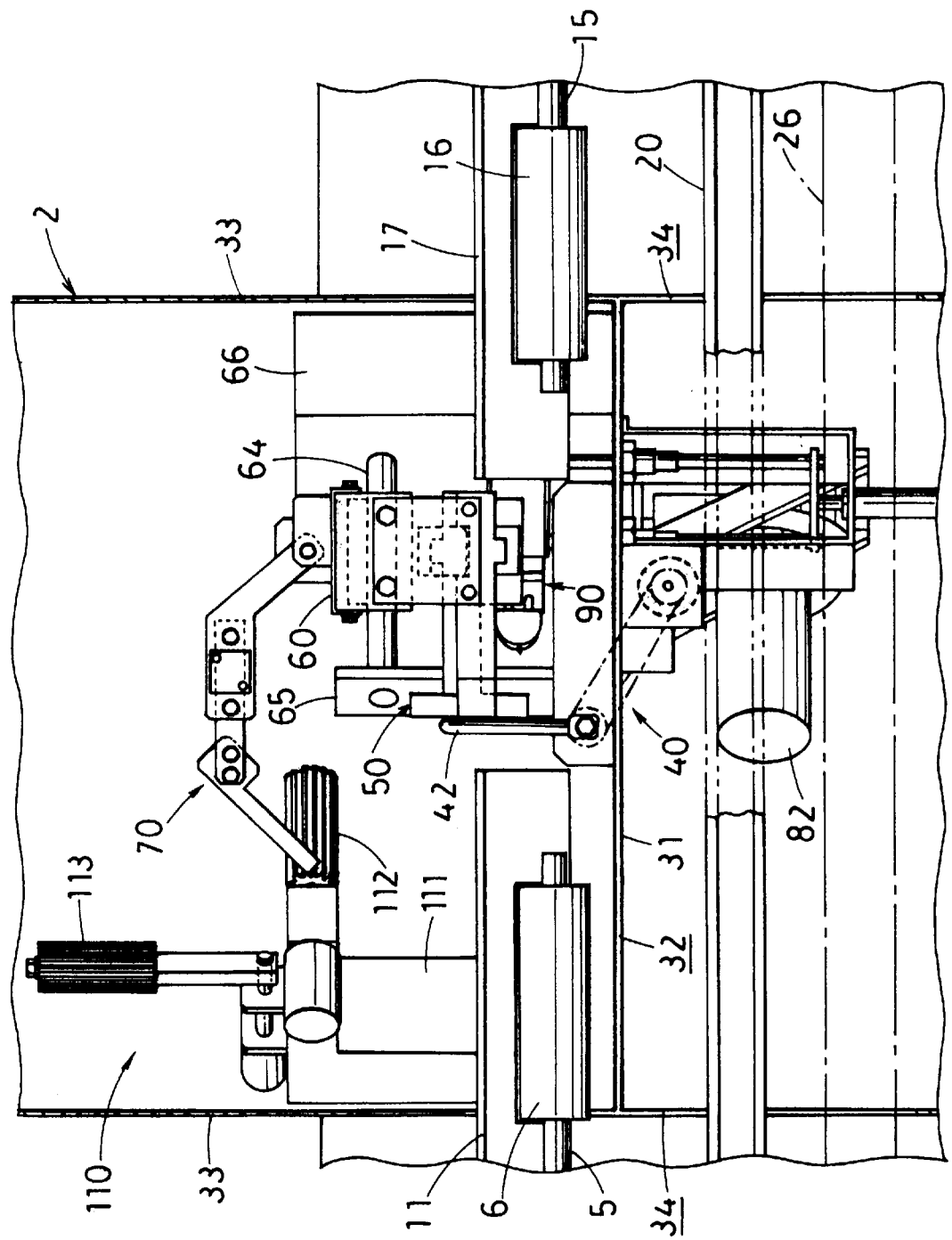
FIG. 5 is a side view taken along line III—III of FIG. 4, showing an interior mechanism of the processing portion.

Next, the construction of the processing portion 2 will be described. As shown in FIGS. 4 and 5, a slot 32 is formed in a horizontally extending base plate 31 in the processing portion 2. The slot 32 is positioned over and extends along the rail 20 to allow the supporting rod 28 to pass through. Left and right side plates 33 of the processing portion 2 are formed with openings 34 to allow the movable member 22 and the food carrying plate 29 to pass through. Also, the base plate 31 is provided with a casing discharge slot 35 for discharging out the casing peeled by a pulling means (as will be discussed later). Further, as shown in FIGS. 1 and 2, the processing portion 2 is provided, at a front upper portion thereof, with an operation switch 36.

Figure 6:
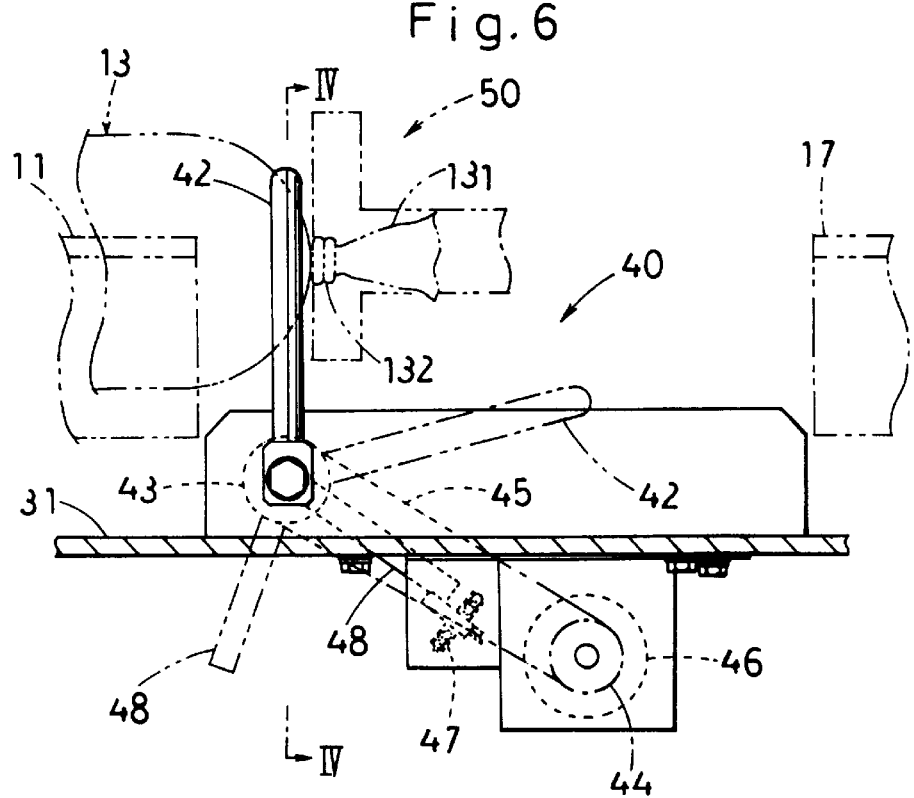
FIG. 6 is a side view showing a food end detecting means.
Figure 7:
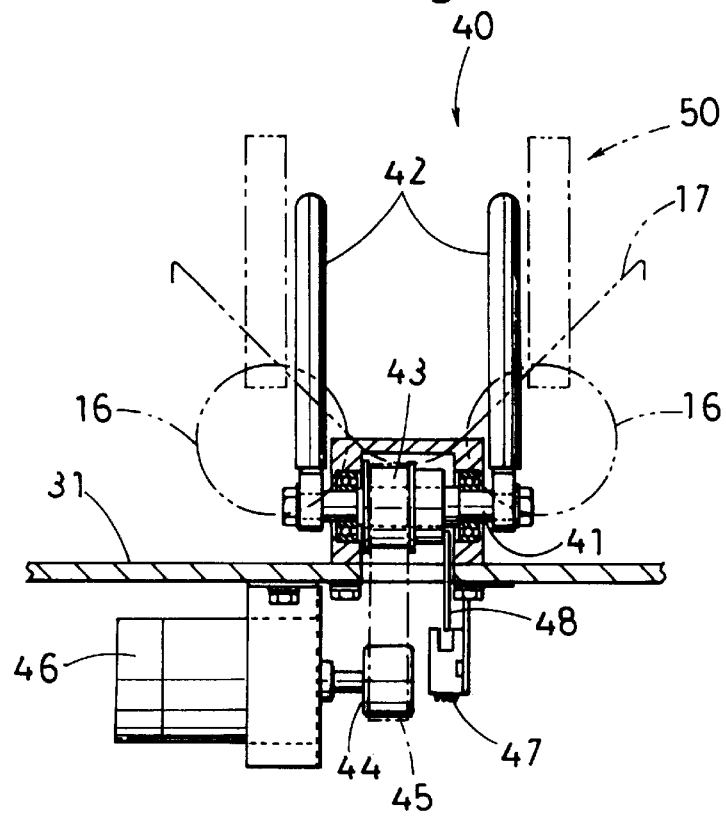
FIG. 7 is a sectional view taken along line IV—IV of FIG. 6.

An end of food detecting means 40 (end detection mechanism) is provided between the trough 11 and the trough 17, and extends from the openings 34 into the interior of the processing portion 2. As shown in FIGS. 6 and 7, the end detecting means 40 includes a pair of detecting rods 42 fixedly mounted on a shaft 41 at opposite ends, and an air motor (a rotary actuator that is pneumatically actuated and so forth) 46 is connected to the shaft 41 through pulleys 43, 44 and a belt 45. The detecting rods 42 are adapted to be swung by the air motor 46 between a first position depicted by a solid line and a second position depicted by a two-dot chain line. A proximity switch 47 is provided under the base plate 31, and an operating rod 48 for the proximity switch 47 is fixedly mounted on the shaft 41.

A first clamp 50 is provided in the vicinity of the detecting rod 42. As shown in FIGS. 8–11, two guiding rods 55, which are fixedly provided between a pair of side plates 53, 54, extend through a pair of clamping portions 51, 52 at base portions thereof forming the first clamp 50. The clamp portions 51, 52 are slidably supported by the guiding rods 55 so that they can be opened and closed. An air cylinder 56 fixedly secured to the side plate 54 is connected to the clamping portion 51, and an air cylinder 57 fixedly secured to the side plate 53 is connected to the clamping portion 52. Thus, the clamping portions 51, 52 are opened and closed by actuation of the air cylinders 56, 57.

In the first clamp 50 thus constructed, two sliding rods 58, which are fixedly provided between the side plates 53, 54, are supported by a swinging arm 60, which extends perpendicular with respect to the troughs 11, 17 (see FIGS. 4 and 5). The rods 58 slidably pass through two supporting plates 61, which project vertically downwards from a bottom of the swinging arm 60. In addition, an air cylinder 62 fixedly secured to the bottom of the swinging arm 60 is connected to the side plate 53. The entire first clamp 50 is moved by the air cylinder 62 between the position depicted by a solid line and the position depicted by a two-dot chain line shown in FIG. 9.

Figure 8:
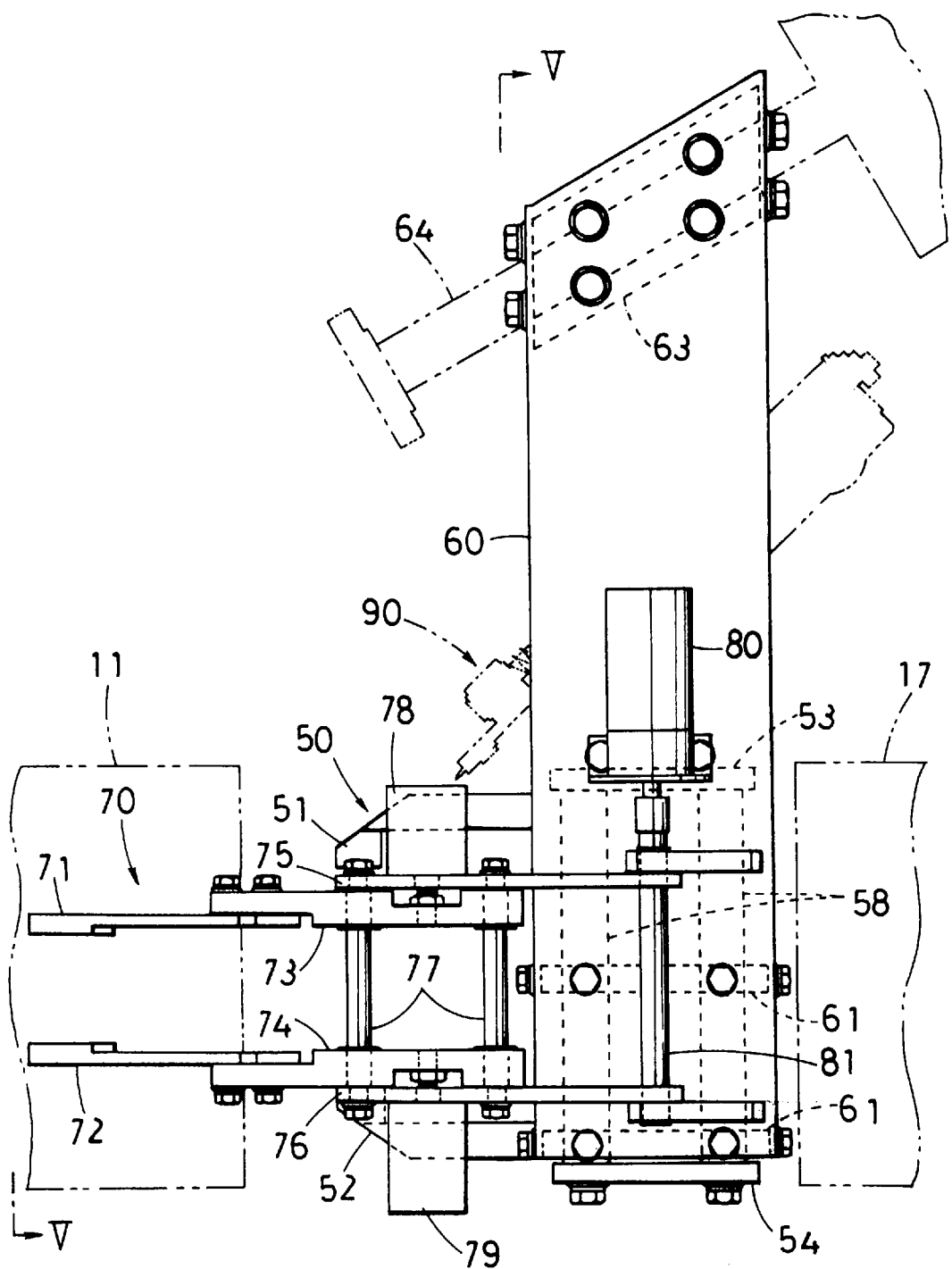
FIG. 8 is a plan view, mainly showing a swinging arm, a first clamp and a second clamp.
Figure 9:
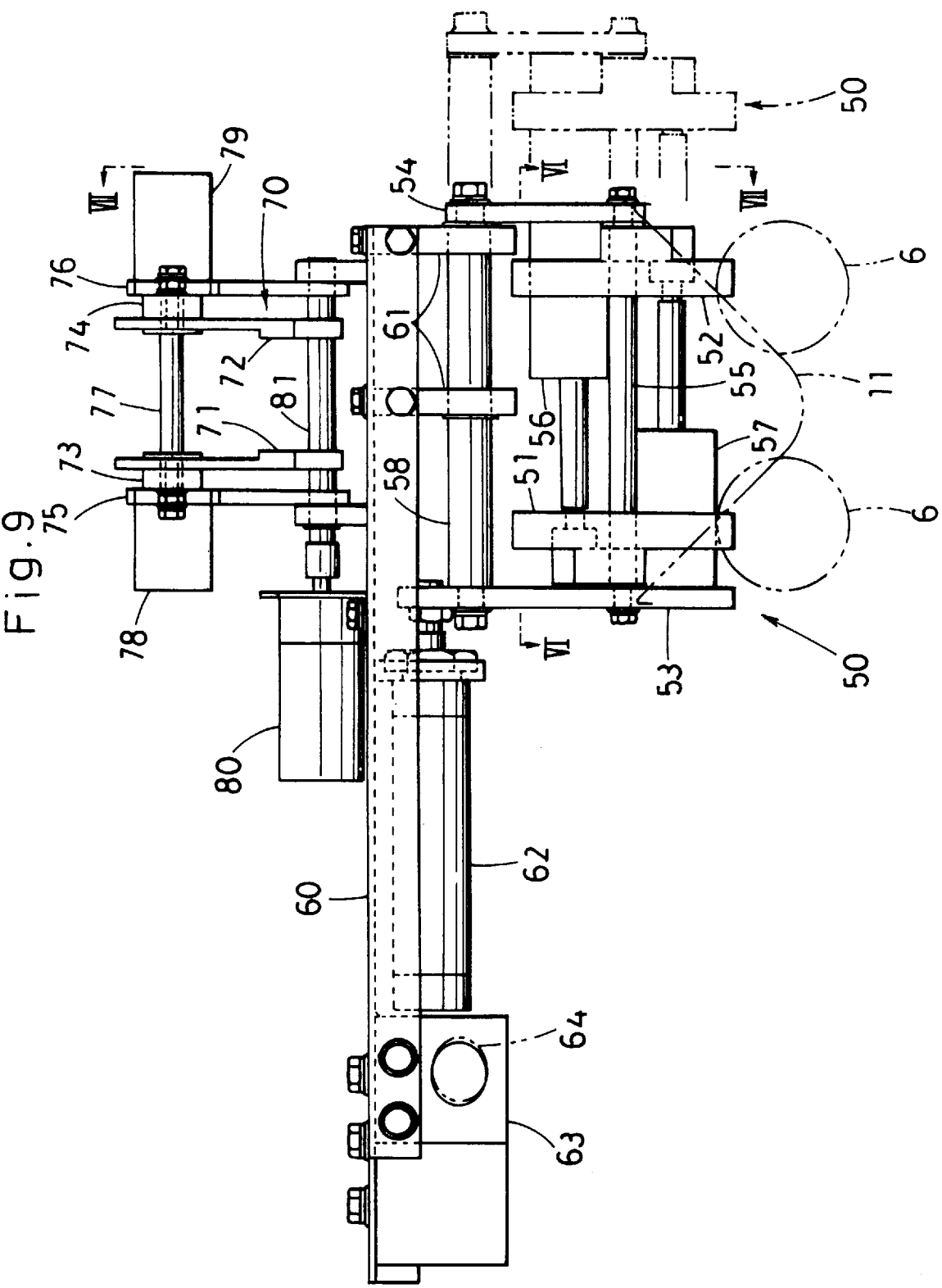
FIG. 9 is a side view taken along line V—V of FIG. 8.
Figure 10:
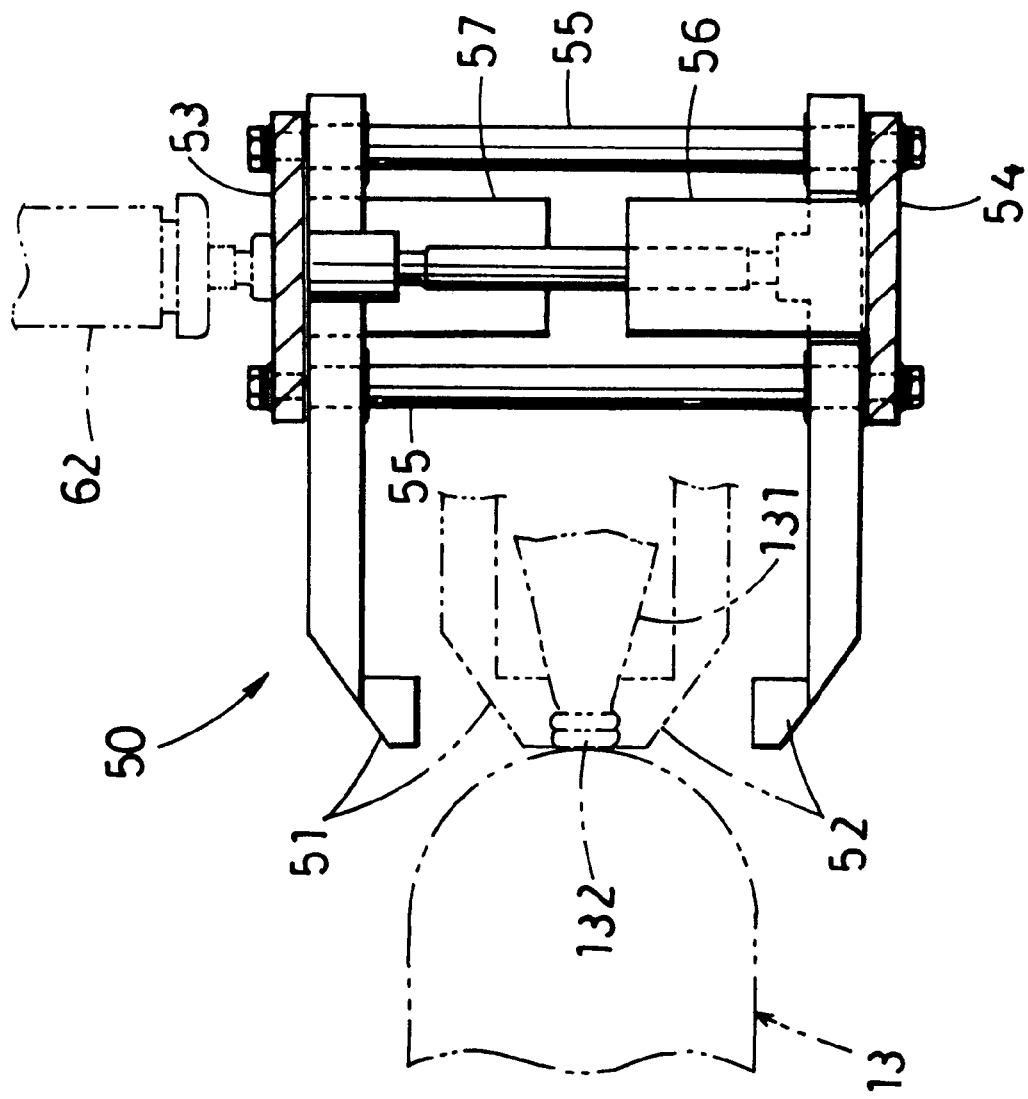
FIG. 10 is a plan view taken along line VI—VI of FIG. 9.
Figure 11:
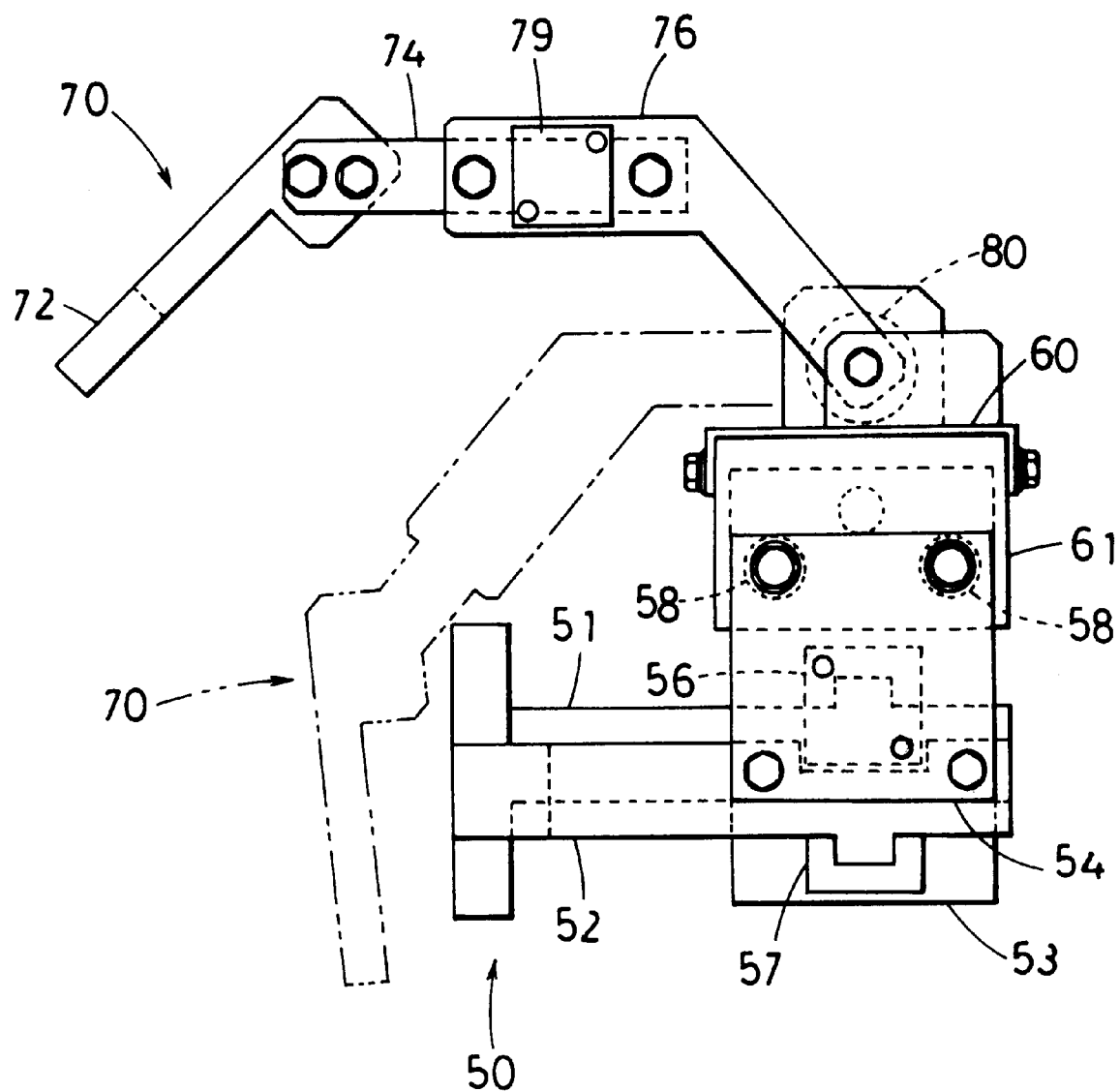
FIG. 11 is a side view taken along line VII—VII of FIG. 9.

A second clamp 70 is arranged over the first clamp 50. As shown in FIGS. 8, 9 and 11, a pair of clamp portions 71, 72 forming the second clamp 70 are supported between a pair of side plates 75, 76 through intermediate rods 73, 74 located at base portions of the clamp portions 71, 72. Specifically, two guiding rods 77 are fixedly provided between the side plates 75, 76. The guiding rods 77 pass through the intermediate rods 73, 74, and the intermediate rods 73, 74 can be freely slid therealong. The clamp portions 71, 72 are supported by the intermediate rods 73, 74 so as to be freely opened and closed. An air cylinder 78 fixedly secured to the side plate 75 is connected to the intermediate rod 73, and an air cylinder 79 fixedly secured to the side plate 76 is connected to the intermediate rod 74. Thus, the clamping portions 71, 72 are opened and closed by the actuation of the air cylinders 78, 79. In addition, base end portions of the side plates 75, 76 are fixedly mounted onto a shaft 81, which is connected to an air motor 80 on an upper surface of the swinging arm 60. When the air motor 80 is rotated in a normal rotation direction and in the opposite direction, the overall second clamp 70 is swung between a first position depicted by a solid line and a second position depicted by a two-dot chain line shown in FIG. 11.

Figure 12:
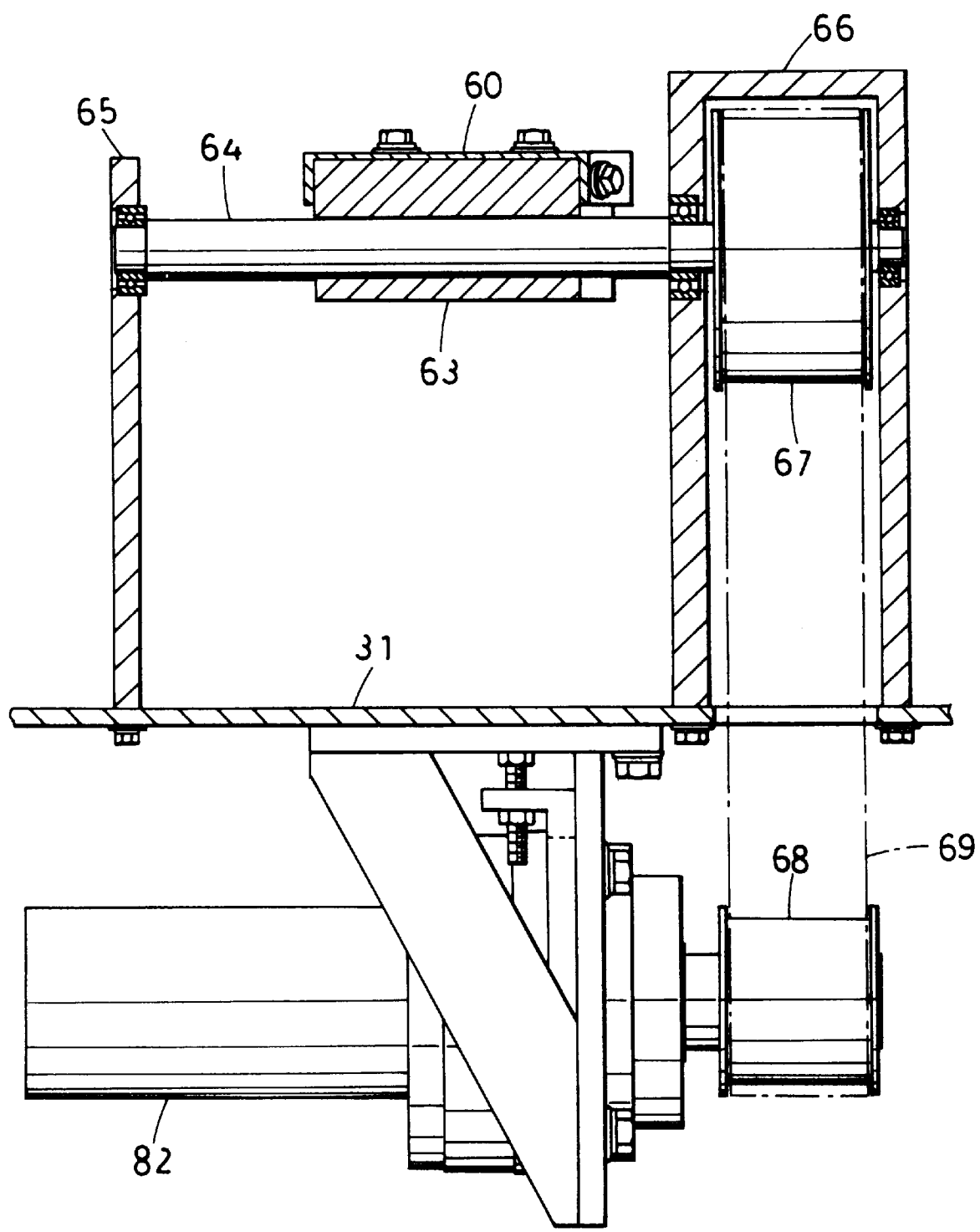
FIG. 12 is an enlarged sectional view taken along line VIII—VIII of FIG. 4, showing a driving portion of the swinging arm.

The swinging arm 60 is fixed, through a mounting block 63 fixedly secured to a base end portion thereof, to a horizontal shaft 64 (see FIG. 4), which is disposed obliquely with respect to a front surface of the processing portion 2, and is supported by the horizontal shaft 64 in a cantilever manner. As shown in FIG. 12, the shaft 64 is rotatably supported between supporting members 65, 66 mounted vertically on the base plate 31 and is connected to an air motor 82, which is disposed under the base plate 31, through pulleys 67, 68 and a belt 69. When the shaft 64 is rotated by the air motor 82, the swinging arm 60 can be swung between a position at which the swinging arm 60 is in a horizontal position as depicted by a solid line in FIGS. 4, 5, 8 and 9, and a position at which the swinging arm 60 is in an obliquely backwards raised position as depicted by a two-dot chain line in FIG. 4. It is noted that (as mentioned later) the swinging arm 60 is adapted to be stopped also at a position at which the tip portion of the swinging arm 60 is raised slightly from its horizontal position. These positions are selectively set by a plurality of limit switches or proximity switches (not shown), which is operated by an operating rod (not shown) that is arranged around a rotation axis of the air motor 82 and projects outwardly therefrom.

Figure 13:
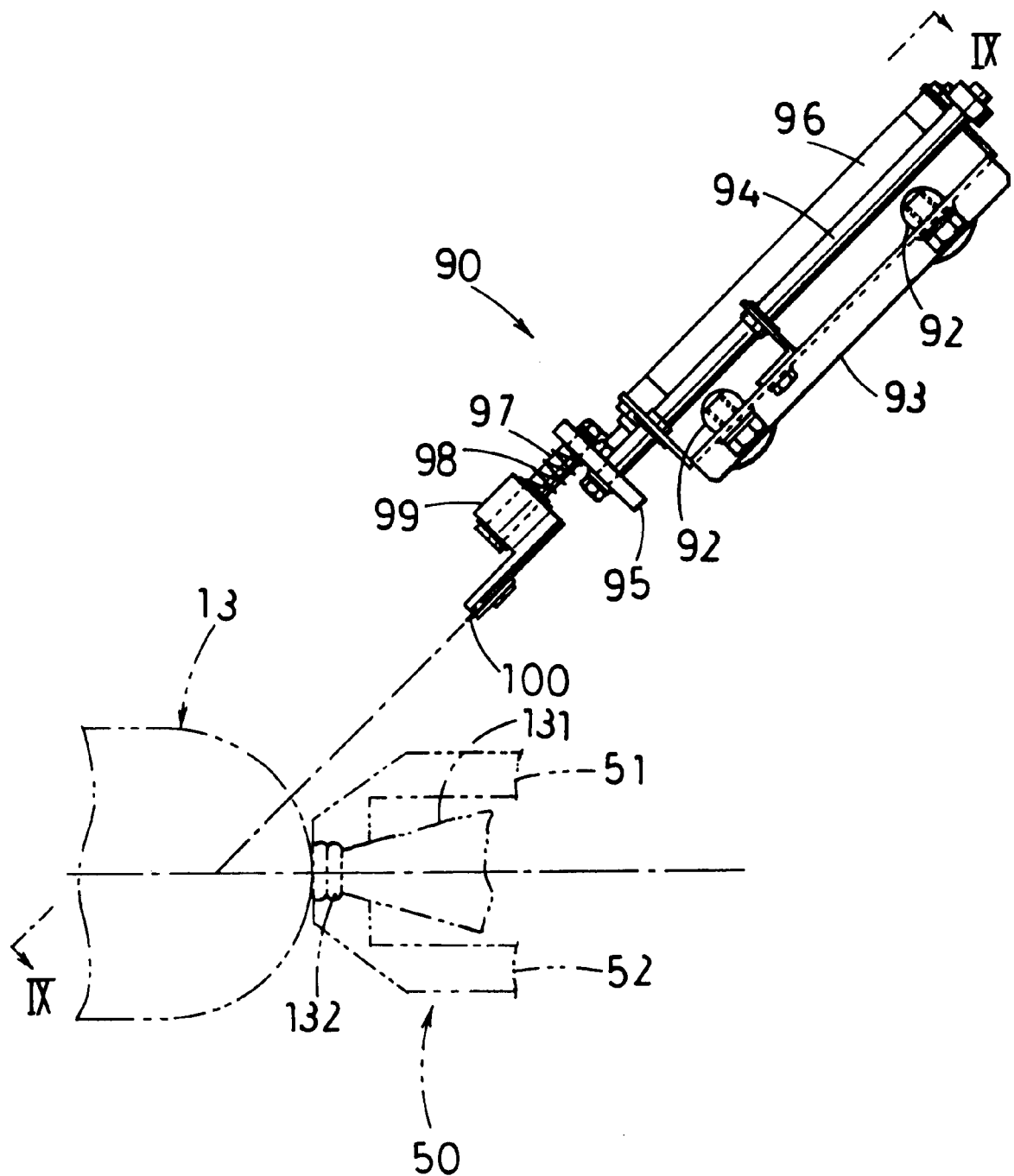
FIG. 13 is a plan view of a cutting means.
Figure 14:
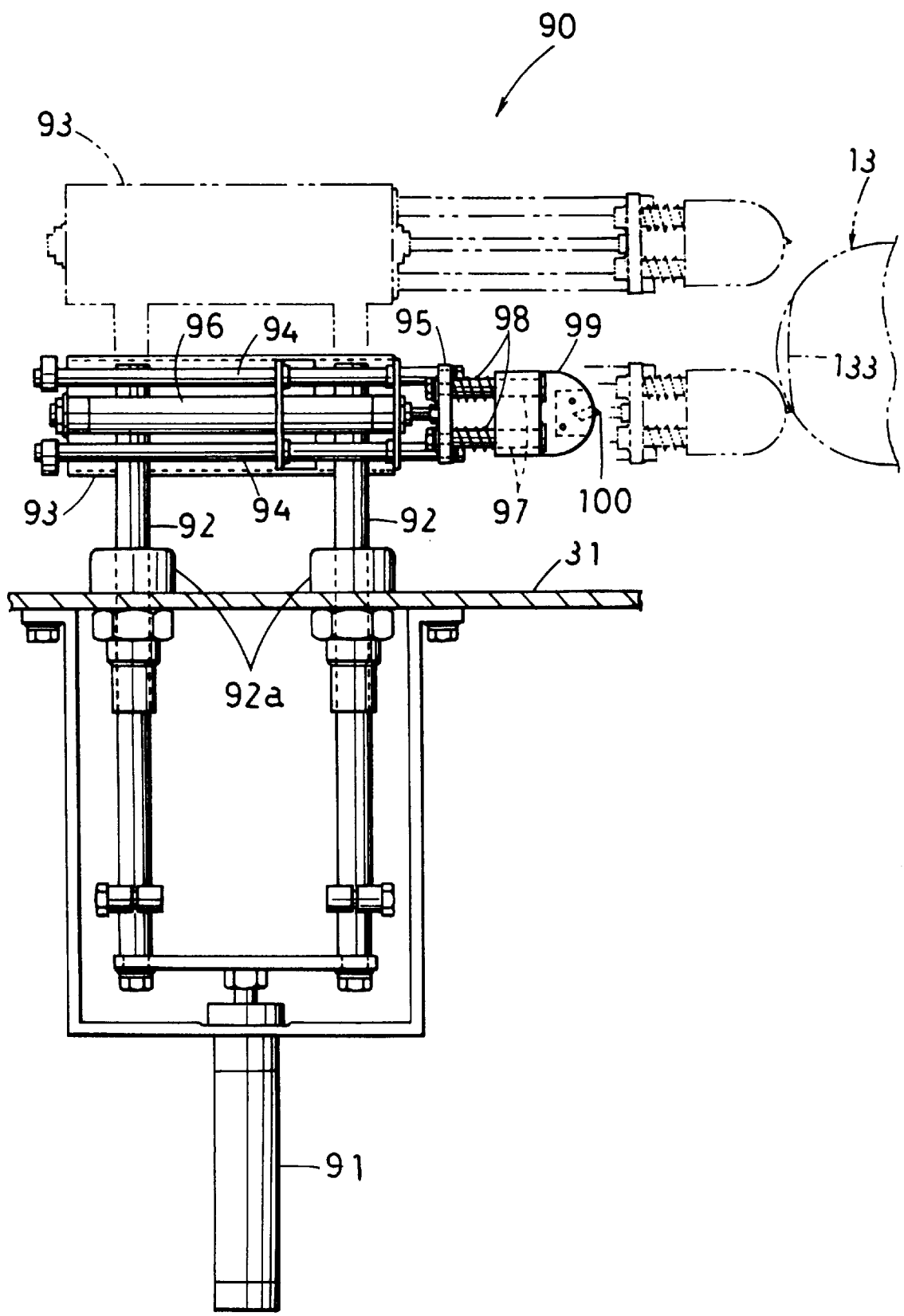
FIG. 14 is a side view taken along line IX—IX of FIG. 13.

A cutting means 90 is provided under the swinging arm 60. As shown in FIGS. 13 and 14, the cutting means 90 comprises two expandable rods 92, which are supported to be freely slid vertically by bushings 92a secured to and extending through the base plate 31. The rods 92 are connected to an air cylinder 91 disposed under the base plate 31 so as to be able to move up and down. A frame 93 is fixedly secured to the expandable rods 92 at upper end portions thereof. Two sliding rods 94 are supported by the frame 93 to be freely slid horizontally. An intermediate plate 95 is fixedly secured to the sliding rods 94 at the tip portions thereof. An air cylinder 96 is fixedly secured to the frame 93 and connected to the intermediate plate 95. A cutter holding member 99 is supported by two supporting rods 97 projecting forward from the intermediate plate 95 so as to able to move back and forth, and is pushed and biased forward by springs 98 fitted around the supporting rods 97. A cutter 100 is provided at a tip portion of the cutter holding member 99 and projects therefrom. With this construction, when the rod of the air cylinder 96 is extended, the cutter holding member 99 and the cutter 100 are moved forward and supported by the sliding rods 94, as depicted by a two-dot chain line in FIG. 14. When the rod of the air cylinder 91 is extended in this state, all the members secured to the frame 93 are raised as a unit, and the unit is supported by the expandable rods 92.

Figure 15:
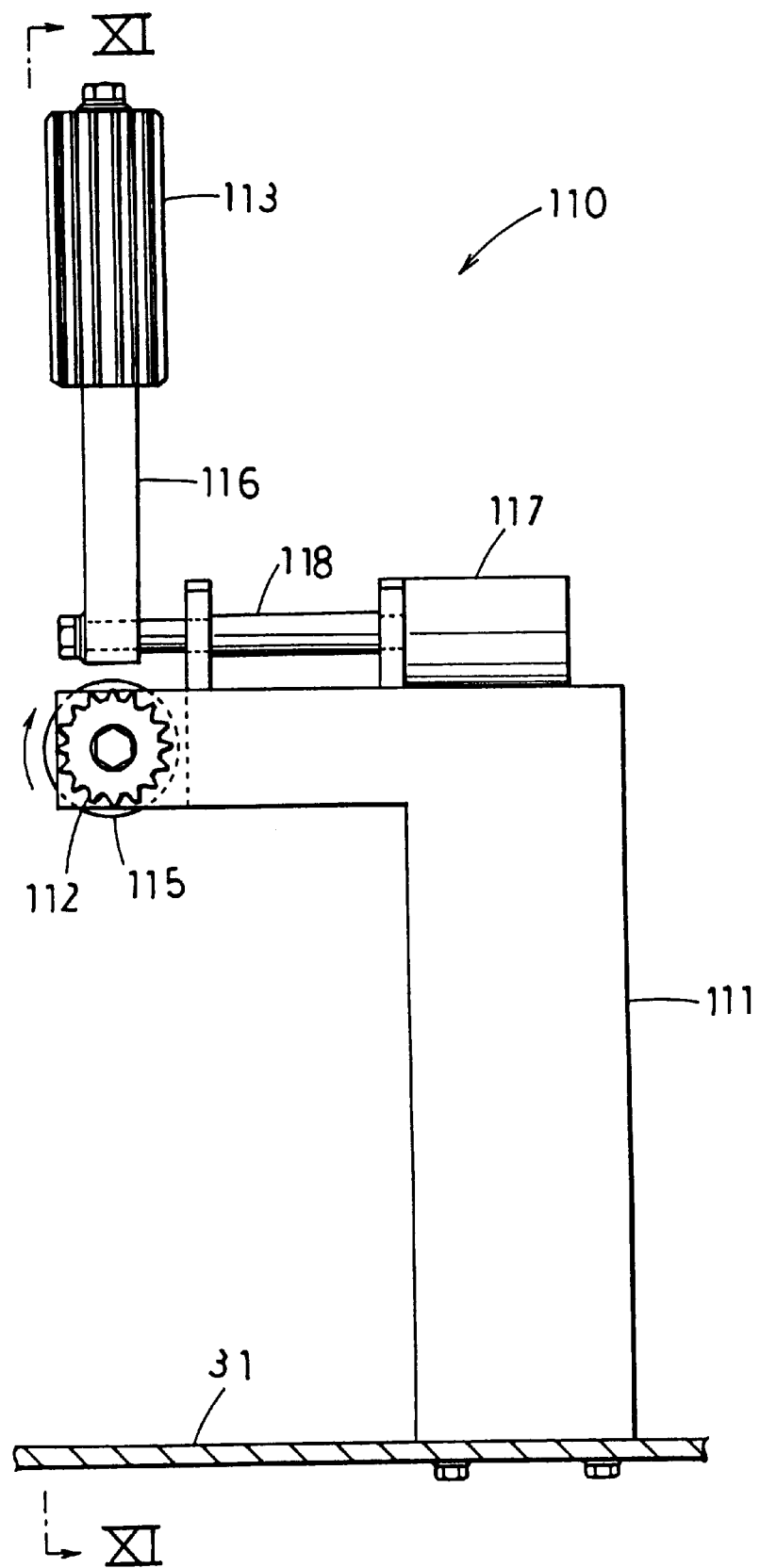
FIG. 15 is an enlarged side view taken along line X—X of FIG. 4, showing a pulling means.
Figure 16:
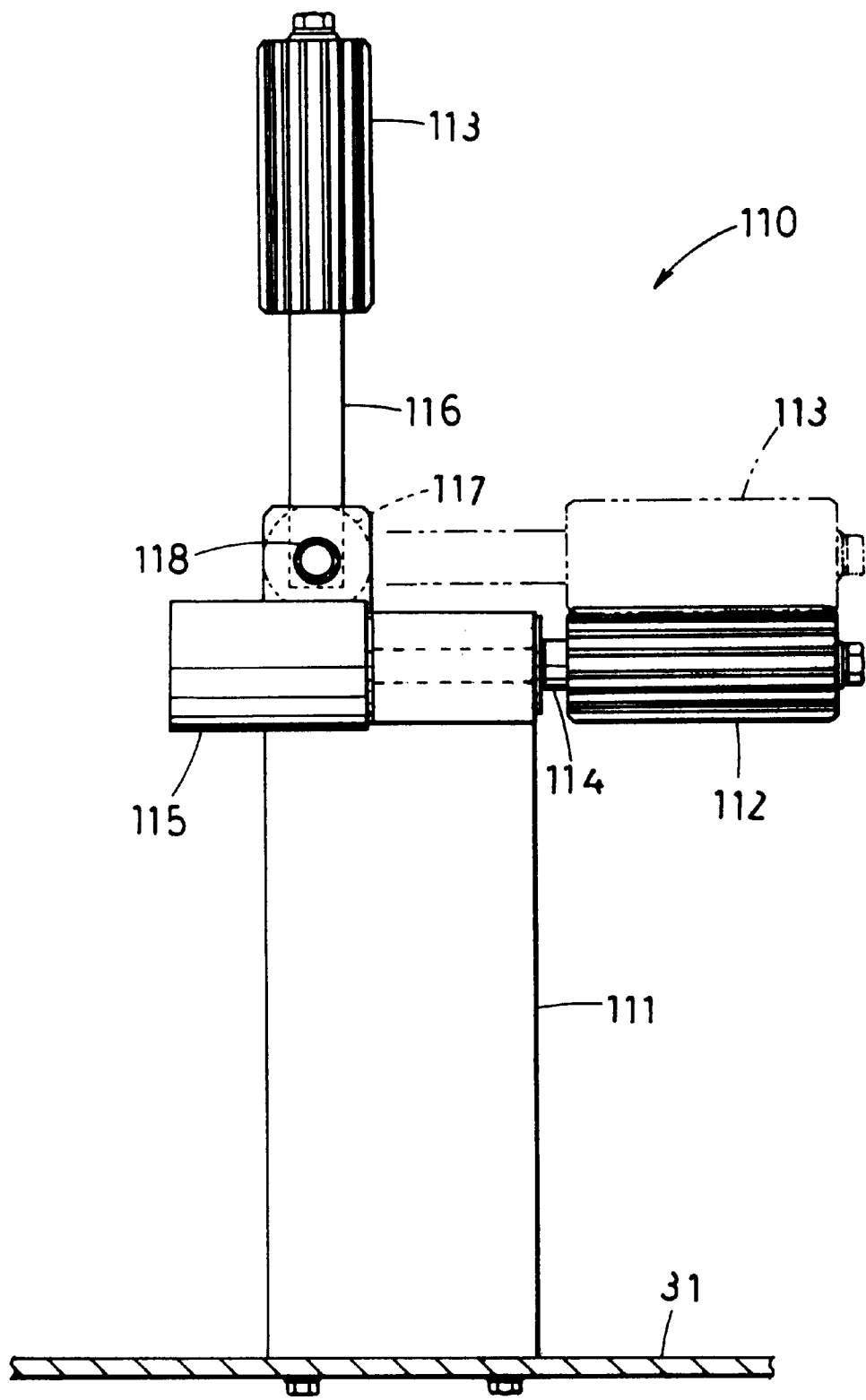
FIG. 16 is a side view taken line along line XI—XI of FIG. 15.

Further, a pulling means 110 for pulling the casing is provided at a lateral side of the trough 11 in the processing portion 2. As shown in FIGS. 15 and 16, the pulling means 110 is provided on a top surface of an inverted L shaped rack 111 and is provided, at its periphery, with a plurality of projecting strips with which a pair of carrying rollers 112, 113 having gear-like sections are in a splined engagement to prevent slippage of the casing and ensure the pulling of the casing. The lower carrying roller 112 is fixedly secured to a horizontally extending driving shaft 114, which is rotatably supported by the rack 111, and is driven to rotate, in a direction shown by an arrow in FIG. 15, by an air motor 115 at a rear side thereof. The upper carrying roller 113 is pivotally supported by a supporting rod 116 at a tip portion thereof so as to be rotatable relative to the supporting rod 116. A base end portion of the supporting rod 116 is fixed to a tip of a rotation axis 118 of an air motor 117 mounted on the top surface of the rack 111. When the air motor 117 is rotated in a normal rotation direction and in the opposite direction, the carrying roller 113 is swung between its vertical position depicted by a solid line in FIGS. 15 and 16, and its horizontal position depicted by a two-dot chain line in FIG. 16. When the carrying roller 113 is in the horizontal position, the air motor 117 can allow the carrying roller 113 to be biased to press (contact) the carrying roller 112.

Next, a description of one embodiment of the invention directed to a method of using the casing removing apparatus 1 will be described below.

The ham 13 stuffed into the casing is placed on the food rotating rollers 6 in the food receiving portion 3 (as depicted by the two-dot chain line in FIG. 2). When the operation switch 36 is activated, the motor 8 (and 14) are actuated to initiate the rotation of the ham 13 in the direction shown by the arrow in FIG. 3, and also the motor 24 is actuated to initiate the movement of the food carrying plate 29 in the direction shown by an arrow in FIG. 2. When the food carrying plate 29 pushes the other end portion of the ham, slippage occurs between the food rotating rollers 6 and the periphery of the ham 13, and the ham 13 is moved in a lengthwise direction to enter the interior of the processing portion 2.

When the ham 13 moves farther into the interior of the processing portion 2, one end portion of the ham 13 will push the pair of detecting rods 42 to allow the detecting rods 42 in the vertical position to be slightly swung toward the trough 17. Then, the shaft 41 is also slightly rotated, and the resulting movement of the operating rod 48 is detected by the proximity switch 47. Detection signals from the proximity switch 47 initiate the next operation.

Specifically, the motors 8, 24 are first stopped to halt the rotation and the lengthwise movement of the ham 13, and the detecting rods 42 are tilted backwards to the position depicted by the two-dot chain line in FIG. 6. Then, the piston rods of the air cylinders 56, 57 are retracted and thereby the clamping portions 51, 52 of the first clamp 50 are closed to hold a clip (sealing means) 132, which seals one end portion of the casing 131 or the other end portion of the casing 131, in a sandwiched relationship between the clamping portions 51, 52, as depicted by the two-dot chain line in FIGS. 6 and 10.

In this state, the cutting means 90 initiates the operation of making a cutting line (cut) 133 in the casing 131. Specifically, the rod of the air cylinder 96 is extended first and thereby the cutter holding member 99 is moved forward to bring the cutter 100 at the tip thereof into contact with the ham 13. The direction of forward movement for the cutter holding member 99 is slanted with respect to the lengthwise direction of the ham 13, as shown in FIG. 13, so that the cutter 100 is brought into contact with a portion close to the one end of the casing 131, which is held by the first clamp 50, obliquely from the front. Then, the rod of the air cylinder 91 is extended and thereby the cutter 100 is moved upwards to make a cutting line 133 in the casing 131, as depicted by a chain line in FIG. 14. By virtue of the expansion and compression of the spring 98, the cutter 100 can move back and forth along the curved surface of the ham 13 to form therein the cutting line 133 having a sufficient vertical length.

Figure 17:
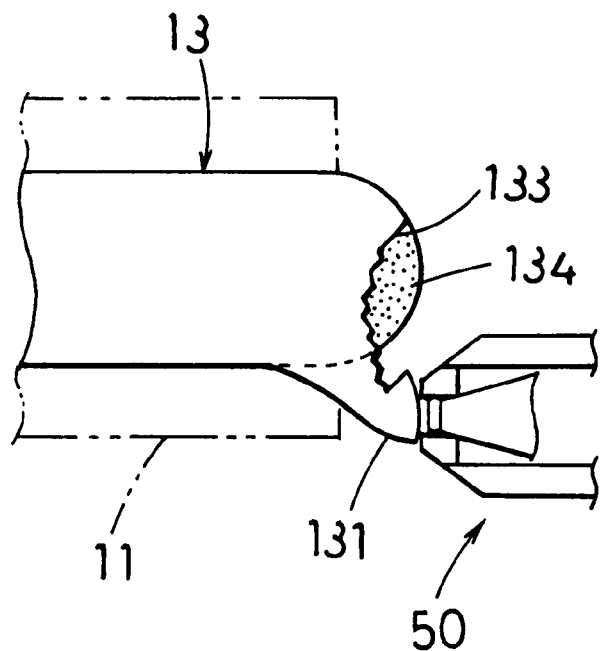
FIG. 17 is a plan view illustrating a step of peeling one end portion of a casing by use of the first clamp.

After the cutting line 133 is formed in the above manner, the air cylinders 96, 91 return the cutting means 90 to the original position, while also the air cylinder 62 pushes the first clamp 50 to the position depicted by the two-dot chain line in FIG. 9. The one end portion of the casing 131 is then pulled horizontally, in a direction opposite to the direction in which the cutting line 133 extends, to strip the one end portion from the ham body (food body) 134, as shown in FIG. 17.

Figure 18:
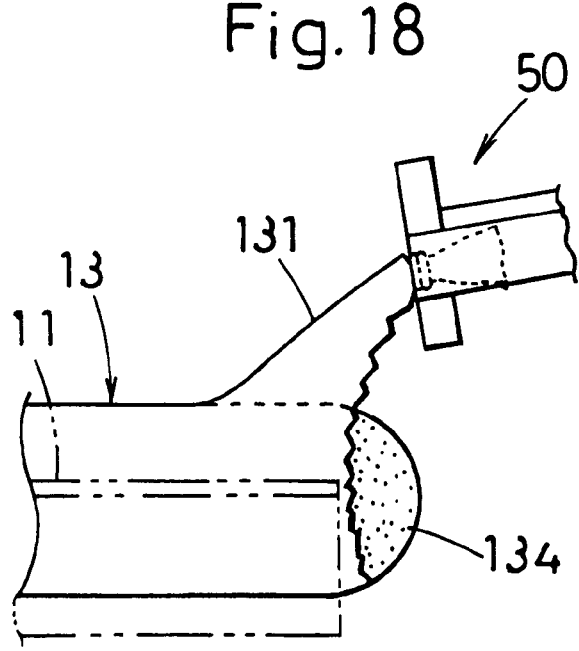
FIG. 18 is a side view illustrating the state of the one end portion of the casing being lifted by the first clamp.
Figure 19:
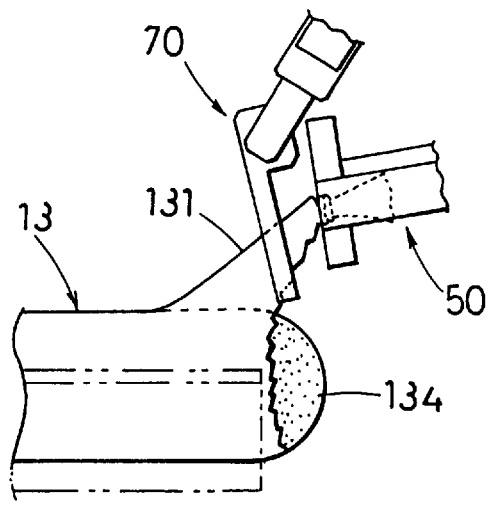
FIG. 19 is a side view illustrating the state of one end portion of the casing being held in a sandwiched relationship by the second clamp.

After the rod of the air cylinder 62 is retracted to return the first clamp 50 to the original position, the air motor 82 is rotated at only a small angle to swing the swinging arm 60 to the extent that its tip portion is raised slightly. Thus, the first clamp 50 is raised, as shown in FIG. 18, so that the stripped end portion of the casing 131 is lifted up. First, the air motor 80 is actuated to lower the second clamp 70 to the position depicted by the two-dot chain line in FIG. 11, and then the air cylinders 78, 79 close the clamping portions 71, 72 of the second clamp 70. As a result of this, the casing 131 between the first clamp 50 and the ham body 134 is held in a sandwiched relationship between the clamping portions 71, 72, as shown in FIG. 19.

Figure 20:
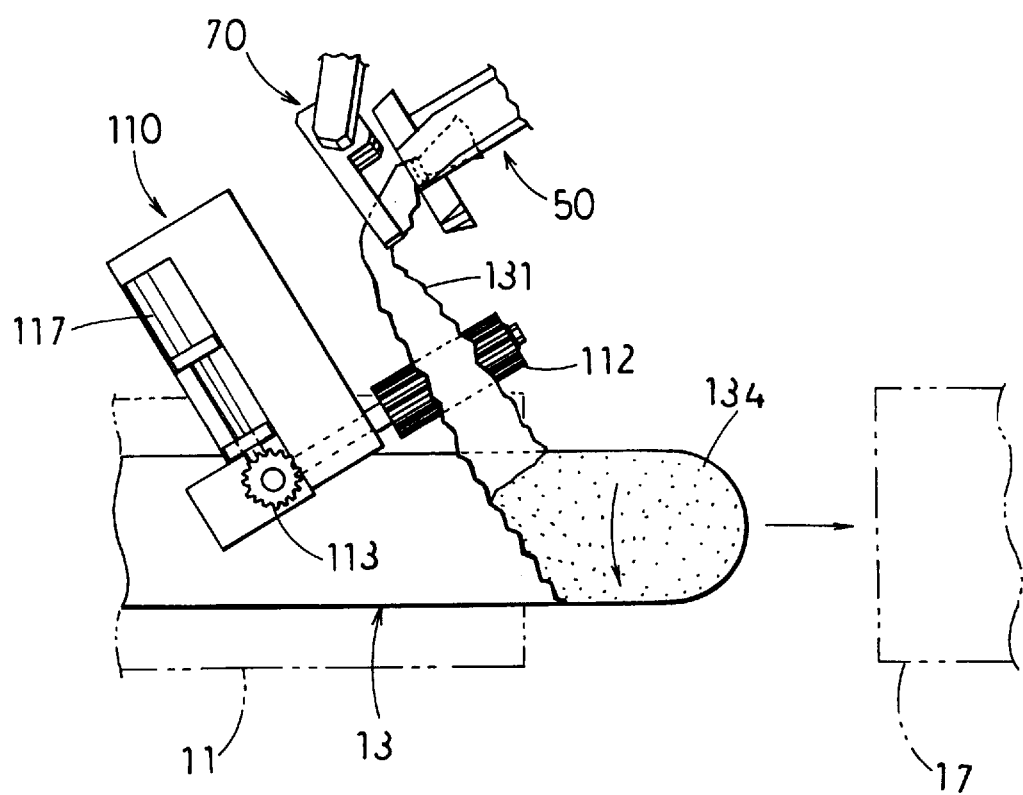
FIG. 20 is a plan view illustrating a step of holding the one end portion of the casing by the pulling means, the first clamp and the second clamp.

Then, the halted motors 8, 14 and 24 are started again to resume the rotation and the lengthwise movement of the ham 13 (the ham body 134). At the same time, the swinging arm 60 is swung backwards around the shaft 64 to a large extent, and thereby the first clamp 50 and the second clamp 70 are moved to a rearward position with respect to the carrying roller 112 of the pulling means 110, while holding the one end portion of the casing 131, as shown in FIG. 20. Thus, the one end portion of the casing 131 is peeled off obliquely with respect to the lengthwise direction of the ham body 134, and the peeled casing 131 is placed on the lower carrying roller 112, as shown in FIG. 20.

Figure 21:
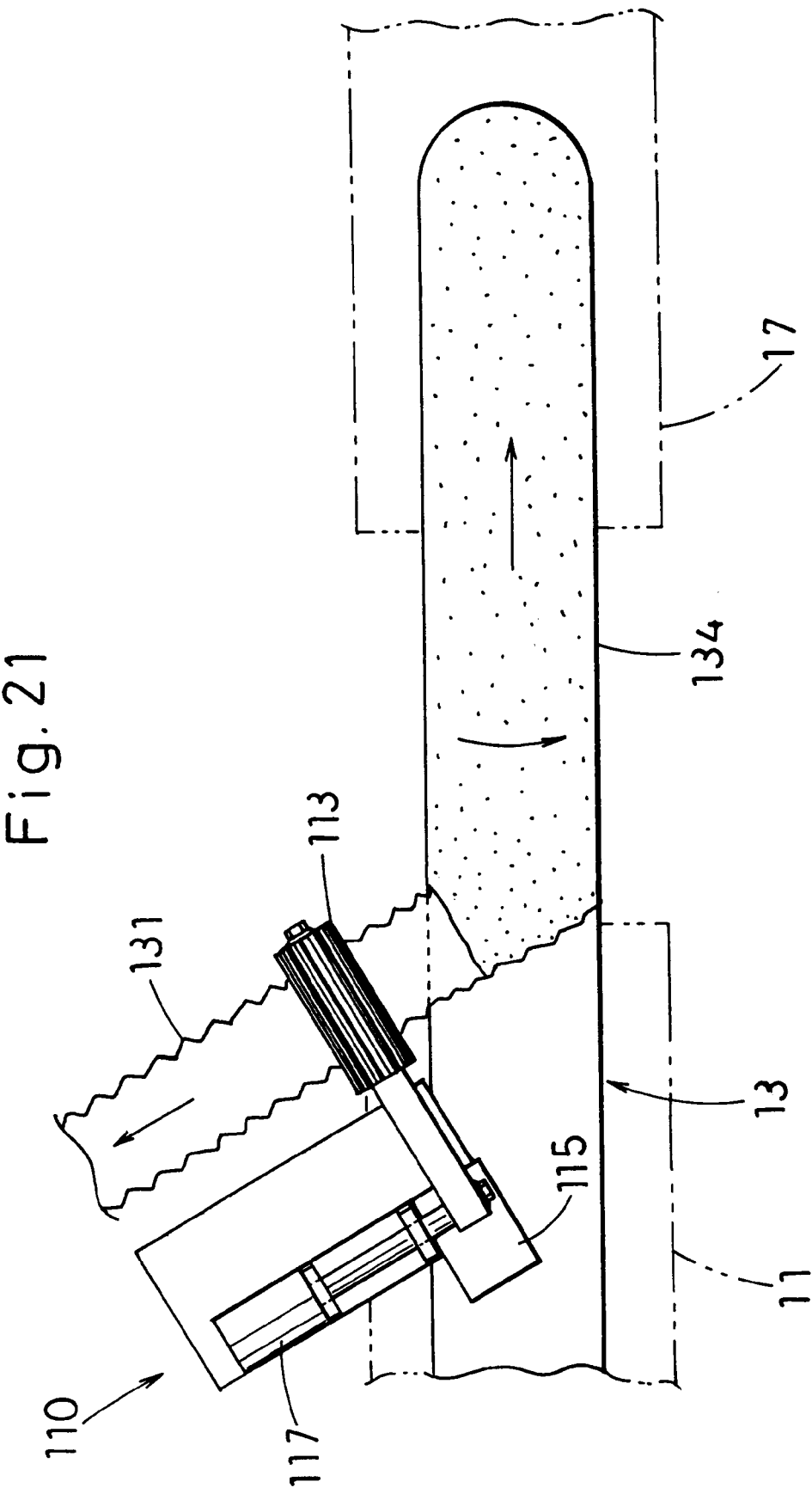
FIG. 21 is a plan view illustrating a step of peeling the casing by means of the pulling means and a moving means.

Immediately after the casing 131 is placed on the carrying roller 112, the air motor 117 is rotated to swing the upper carrying roller 113 from its vertical position to its horizontal position and to bring it into contact with the lower carrying roller 112 in order to hold the casing 131 between the pair of carrying rollers 112, 113. Then, the first clamp 50 and the second clamp 70 are opened to release the casing 131 therefrom, while the air motor 115 is started to drive the rotation of the carrying roller 112 to carry the casing 131 out obliquely backwards with respect to the moving direction of the ham 13, as indicated by an arrow in FIG. 21. Thus, the casing 131 is carried outwardly, while the ham body 134 is continuously driven to rotate and to move in the lengthwise direction (the ham body 134 is rotated counterclockwise, when viewed from downstream with respect to the moving direction). As a result of this, the casing 131 is torn spirally and peeled off from the ham body 134, and the long strip of peeled casing 131 is discharged from the casing discharge slot 35 into a casing accommodating box (not shown).

When the casing 131 is peeled so far as to reach a position in the vicinity of the other end portion of the ham 13 and the food carrying plate 29 reaches the position in the vicinity of the pulling means 110 (as depicted by a solid line in FIG. 22), the air motor 115 and the motors 8, 14 are stopped to halt the pulling and the rotation of the casing 131. Only the lengthwise movement of the ham by the food carrying plate 29 is continued. At this time, the carrying rollers 112, 113 of the pulling means 110 halt, while holding the casing 131 therebetween, so that the other end portion of the remaining casing 131 is pulled in the direction opposite to the moving direction of the ham 13. Thus, at the point in time when the food carrying plate 29 and the ham 13 are moved so far as to reach a position in the vicinity of the position indicated by a two-dot chain line in FIG. 22, the other end portion of the remaining casing 131 is pulled from the other end portion of the ham body 134.

Figure 22:
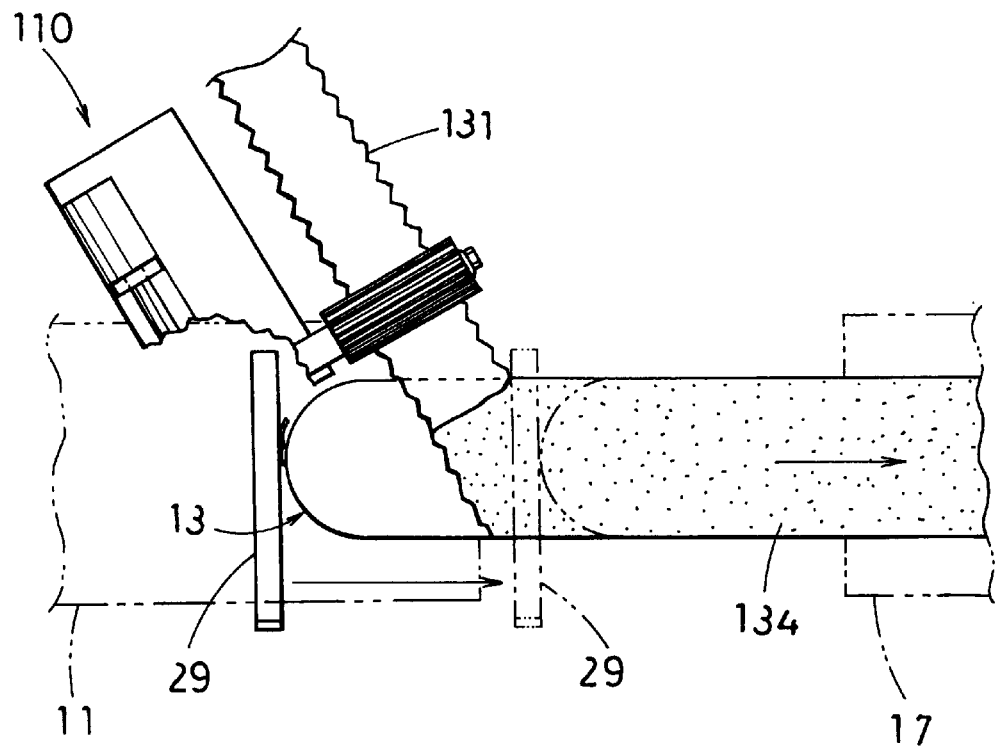
FIG. 22 is a plan view illustrating a step of peeling the other end portion of the casing.

After the whole casing 131 is removed from the ham, the food carrying plate 29 is momentarily returned to a position in the vicinity of the position indicated by a sold line in FIG. 22, and also the carrying roller 112 of the pulling means 110 is put in motion to feed the remainder of the casing 131 including the peeled other end portion into the casing discharge slot 35. Further, at the same time, the motors 8, 14 are started to resume the rotation of the ham body 134. Then, the food carrying plate 29 is moved to the other end of the rail 20 to push out the entire ham body 134 onto the food rotating rollers 16 of the food take-out portion 4. When the ham body 134 is pushed out to a specified position, the drive for rotation of the ham body 134 is stopped and the food carrying plate 29 is returned to the one end of the food receiving portion 3 in order to receive the next ham 13, and thus completing a predetermined sequence of operations.

Incidentally, the food carrying plate 29 is momentarily returned in order to prevent the casing 131 from being caught in the food carrying plate 29 when the remainder of the casing 131 is fed into the casing discharge slot 35. Also, the ham body 134 is rotationally driven to reduce the friction between the ham body 134 and the food rotating rollers 15 as much as possible in order to prevent the ham body 134 from being damaged.

Figure 23:
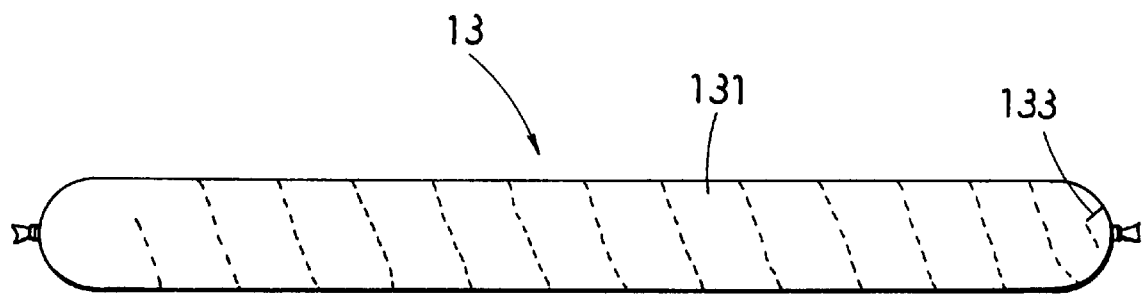
FIG. 23 is an explanatory view illustrating the state of the casing being peeled according to one embodiment of the invention.

According to the invention, the entire casing 131 may be peeled spirally. However, the other end portion of the peeled casing 131 may then be caught inside the other end of a semi-spherical shape of the ham body 134. The resulting resistance may cause the casing 131 to be torn off at some midpoint, and as such may cause the other end portion of the casing 131 to remain on the ham body 134. In contrast to this, according to the illustrated embodiment, since the casing 131 is peeled spirally between the one end portion in which a cutting line 133 is made and the portion in the vicinity of the other end, as shown in FIG. 23, and the remaining other end portion of the casing 131 is peeled in the lengthwise direction of the ham 13, the entire casing 131 can be assuredly removed from the ham body.

It is needless to say that the technical scope of the invention is not limited to the embodiment illustrated above. For example, in the embodiment illustrated above, the ham is an example of a food stuffed in a casing, but the invention is applicable to other foods stuffed in casings, such as sausages.

Also, in the embodiment illustrated above, the food rotating rollers 6, 16 are rotationally driven by the motors 8, 14, but the invention may be modified such that the food rotating rollers 6, 16 can be simply pivoted in a freely rotatable manner, without being rotationally driven, and the food body on the food rotating rollers can be rotated instead by the force of the pulling means pulling the casing.

In the embodiment illustrated above, the moving means referred to in the present invention is constructed from the food rotating rollers 6, 16 for rotating the food body and the food carrying plate 29 for moving the food body in the lengthwise direction. Since the carrying means allows the pulling means and the food body to move relative to each other with respect to the longitudinal direction and the circumferential direction of the food body, the above construction may, for example, be modified such that the food body can only be rotated circumferentially without being moved longitudinally and the pulling means can be moved instead along the lengthwise direction of the food body. On the other hand, another practical modification may be that the food body can only be moved in the lengthwise direction without being rotated circumferentially and the pulling means can be rotated instead around the longitudinal axis of the food body.

Also, in the embodiment illustrated above, there is provided the cutting means 90 for making the cutting line 133 in the casing 131, but the cutting means 90 may be dispensable. For example, the first clamp 50 holding the one end portion of the casing 131 may move transversely to make a crack in a portion of the casing 131 in the vicinity of the one end of the casing 131.

In addition, in the embodiment illustrated above, the clamping means referred to in the present invention is constructed from the first clamp 50 and the second clamp 70, to avoid operational hindrances even when the one end of the casing 131 drops from either the first clamp 50 or the second clamp 70. Of course, a practical variation of the clamping means is to construct it with the first clamp 50 only.

Further, a "semiautomatic" casing removing apparatus with no clamping means is also practical. The one end portion of the casing 131 can be manually stripped in advance and then the stripped end portion of the casing 131 can be manually held by the pulling means 110.

Also, in the embodiment illustrated above, the pulling means 110 is constructed so that the casing 131 can be held between the pair of carrying rollers 112, 113 and can be carried outwardly. The pulling means 110 may be constructed from, for example, a winding reel having a holder for holding one end portion of the casing 131 at a point at the periphery so that the one end portion of the casing 131 is held by the holder, and the winding reel can be rotationally driven to wind the casing 131 thereon.

Furthermore, in the embodiment illustrated above, the supplying of the food stuffed in the casing to the food receiving portion 3 and the removal of the food body from the food take-out portion 4 are both performed manually. Of course, modification may be made such that a food mounting base is capable of mounting thereon a plurality of foods stuffed in casings (for example provided in the food receiving portion 3) so that the foods stuffed in casings on the food mounting base can be automatically fed into the food receiving portion 3 one by one. A similar practical modification is that the removal of the food bodies from the food take-out portion 4 may be performed automatically.

As aforementioned, the invention is constructed such that after one end portion of the casing is stripped from the food body, the stripped one end portion is held by and pulled outwardly by the pulling means, while the pulling means and the food body are allowed to move relative to each other with respect to the longitudinal direction and the circumferential direction of the food body, so that the casing can be peeled spirally from the food body. The invention thus constructed enables the removal of the casing, which previously has been done with a large expenditure in time and labor, to be performed automatically and very efficiently.

What is claimed is:

1. An apparatus for removing a casing from a food body which has a trailing end portion and a leading end portion, comprising:
   a pair of food rotating rollers provided in a parallel relationship with respect to one another for rotating the food body;
   a food carrying plate provided along said rollers for pushing the food body from the trailing end portion along said rollers;
   a first clamp provided along said rollers for grasping the leading end portion of the food body; and
   a pulling mechanism provided along said rollers for pulling spirally the casing from the food body.

2. An apparatus according to claim 1, further comprising a cutting mechanism provided along said rollers for cutting the casing at the leading end portion of the food body when the leading end portion is grasped by said first clamp.

3. An apparatus according to claim 2, further comprising a base plate, and wherein said base plate supports said cutting mechanism.

4. An apparatus according to claim 3, wherein said cutting mechanism includes a pair of bushings secured to said base plate, a pair of expandable rods slidably supported by said bushings, an air cylinder disposed under said base plate and connected to said expandable rods, a frame secured to said expandable rods, a pair of sliding rods slidably supported by said frame, an intermediate plate secured to said sliding rods, an air cylinder secured to said frame and connected to said intermediate plate, a pair of supporting rods slidably supported by said intermediate plate, a cutter holding member supported by said supporting rods, a pair of springs fitted around said supporting rods between said intermediate plate and said cutter holding member, and a cutter provided on said cutter holding member.

5. An apparatus according to claim 3, further comprising a swing arm pivotally supported by said base plate, and wherein said swing arm supports said first clamp.

6. An apparatus according to claim 5, further comprising a second clamp supported by said swing arm above said first clamp.

7. An apparatus according to claim 2, wherein said rollers and said food carrying plate are operable to stop moving when the food body is adjacent to said first clamp, and wherein said cutting mechanism is operable to cut the casing near the leading end portion of the food body when the leading end portion of the food body is grasped by said first clamp.

8. An apparatus according to claim 1, further comprising a second clamp provided above said first clamp for positioning the casing onto said pulling mechanism.

9. An apparatus according to claim 8, wherein said second clamp includes a pair of side plates, a pair of guide rods provided between said side plates, a pair of intermediate rods slidably supported by said guide rods, a pair of clamp portions supported by said intermediate rods, a first air cylinder secured to one of said side plates and connected to one of said intermediate rods, and a second air cylinder secured to the other of said side plates and connected to the other of said intermediate rods.

10. An apparatus according to claim 9, further comprising an air motor having a shaft connected to said side plates for swinging said second clamp.

11. An apparatus according to claim 1, further comprising a food receiving portion where the food body is loaded and a food take-out portion where the food body is unloaded after the casing is removed, wherein said food receiving portion has said rollers extending therethrough, and said food take out portion has a second pair of food rotating rollers provided in a parallel relationship with respect to one another within said food take-out portion.

12. An apparatus according to claim 1, further comprising a trough provided above said rollers along said transfer path, wherein said trough includes openings through which said rollers partially project.

13. An apparatus according to claim 1, further comprising an end detection mechanism provided along said rollers for detecting the leading end portion of the food body.

14. An apparatus according to claim 13, wherein said end detection mechanism includes a shaft, a pair detecting rods mounted on opposite ends of said shaft, an operating rod mounted on said shaft, and a proximity switch provided under said shaft to sense movement of said operating rod.

15. An apparatus according to claim 14, wherein said end detection mechanism includes air motor coupled to said shaft for pivoting said detecting rods.

16. An apparatus according to claim 1, further comprising a pair of food rotating shafts, a motor coupled to said shafts, and wherein said rollers are provide on said shafts.

17. An apparatus according to claim 1, further comprising a support rod connected to said food carrying plate, a rail arranged in a parallel relationship with respect to said rollers, a moveable member supported by said rail, and a motor coupled to said moveable member for moving said moveable member.

18. An apparatus according to claim 1, wherein said first clamp includes a pair of clamping portions which contact the leading end portion of the food body when said first clamp grasps the leading end portion of the food body.

19. An apparatus according to claim 18, wherein said first clamp includes a pair of side plates, a pair of guiding rods provided between said side plates, wherein said guiding rods extend through said clamping portions, a first air cylinder secured to one of said side plates and connected to one of said clamping portions, and a second air cylinder secured to the other of said side plates and connected to the other of said clamping portions.

20. An apparatus according to claim 19, wherein said first clamp includes two sliding rods provided between said side plates and a swinging arm supported by said side plates.

21. An apparatus according to claim 1, wherein said pulling mechanism includes a rack, a lower carrying roller rotatably supported by said rack and an upper carrying roller pivotally supported on said rack above said lower carrying roller.

22. An apparatus according to claim 1, wherein said rollers and said pulling mechanism are operable to stop moving when the casing is pulled near the trailing end portion of the food body while said food carrying plate continues to push the food body such that the casing at the trailing end portion of the food body is pulled from the food body.

* * * * *